(12) United States Patent
Van Eerde et al.

(10) Patent No.: US 7,736,555 B2
(45) Date of Patent: Jun. 15, 2010

(54) METHOD FOR CONTROLLING FILL SPEED IN A MOLDING SYSTEM

(75) Inventors: Trevor Paul Van Eerde, Grand Valley (CA); Joachim Johannes Niewels, Thornton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 331 days.

(21) Appl. No.: 12/033,116

(22) Filed: Feb. 19, 2008

(65) Prior Publication Data
US 2009/0206501 A1 Aug. 20, 2009

(51) Int. Cl.
*B29C 45/76* (2006.01)
(52) U.S. Cl. .................. 264/40.1; 264/328.8; 425/145; 425/572
(58) Field of Classification Search ............... 264/40.7, 264/40.1, 328.8; 425/145, 572, 588
See application file for complete search history.

(56) References Cited

U.S. PATENT DOCUMENTS 3,840,312 A * 10/1974 Paulson et al. ............... 425/149
4,735,760 A    4/1988 Kumazaki
5,549,857 A    8/1996 Kamiguchi et al.
6,558,588 B2   5/2003 Shioiri et al.
6,841,103 B2 * 1/2005 Kishi et al. ................ 264/40.5
6,875,383 B2 * 4/2005 Smith et al. ................ 264/40.5
2005/0053684 A1 3/2005 Pitschebeder et al.

FOREIGN PATENT DOCUMENTS

| CA | 2415515 C    | 7/2003  |
| EP | 0897786 B1   | 2/1999  |
| EP | 1761375 A1   | 3/2007  |
| JP | 2001179786 A | 7/2001  |
| WO | 2007140447 A1 | 12/2007 |

* cited by examiner

*Primary Examiner*—Jill L Heitbrink
(74) *Attorney, Agent, or Firm*—Husky Intellectual Property Services

(57) ABSTRACT

There is disclosed a method for controlling a fill speed of an injection unit, the method executable in a computing apparatus configured to control a plunger actuator of the injection unit. The method comprises receiving an indication of a mold-cavity-filling parameter, the mold-cavity-filling parameter being indicative of a number of molding cavities of a multi-cavity mold having been filled; responsive to the mold-cavity-filling parameter satisfying a pre-determined threshold, releasing a control signal to the plunger actuator to control speed associated with a plunger of the injection unit from a first filling speed to a second filling speed.

25 Claims, 3 Drawing Sheets

METHOD FOR CONTROLLING FILL SPEED IN A MOLDING SYSTEM

FIELD OF THE INVENTION

The present invention generally relates to, but is not limited to, a molding system, and more specifically the present invention relates to, but is not limited to, a stress-reducing device and a method of using same.

BACKGROUND OF THE INVENTION

Molding is a process by virtue of which a molded article can be formed from molding material by using a molding system. Various molded articles can be formed by using the molding process, such as an injection molding process. One example of the molded article that can be formed, for example, from polyethylene terephthalate (PET) material is a preform that is capable of being subsequently blow-molded into a beverage container, such as, a bottle and the like. Other examples of the molded articles include thin-wall containers (i.e. yogurt containers, cups, etc), medical appliances and the like.

As an illustration, injection molding of PET material involves heating the PET material (ex. PET pellets, PEN powder, PLA, etc.) to a homogeneous molten state and injecting, under pressure, the so-melted PET material into a molding cavity defined, at least in part, by a female cavity piece and a male core piece mounted respectively on a cavity plate and a core plate of a mold. The cavity plate and the core plate are urged together and are held together by clamp force, the clamp force being sufficient to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Thereafter, the molded article can be ejected off the core piece by use of one or more ejection structures. Ejection structures are known to assist in removing the molded articles from the core halves. Examples of the ejection structures include stripper plates, stripper rings and neck rings, ejector pins, etc.

As generally known in the art, known molding systems can cause a number of visible defects to the molded articles. One such problem is known in the art as "rolled threads" or, in other words, a significant deformation to a neck finish of the preforms.

U.S. Pat. No. 6,558,588 issued to Shioiri et al. on May 6, 2003 discloses a method for controlling an injection molding machine, where a screw is advanced from an injection start position by means of velocity control, and when the screw reaches a control changeover point, pressure control is effected in place of the velocity control to apply pressure to the screw. Preliminary molding is performed to obtain an acceptable product; a total charged amount of resin during the preliminary mold is obtained on the basis of a movement distance over which the screw has moved before reaching the control changeover point during the preliminary mold; and the total charged amount is stored as a changeover target value. During ordinary molding, a total charged amount of resin is obtained on the basis of a movement distance over which the screw advances from the injection start position; and pressure control is started when the total charged amount reaches the changeover target value. Thus, the total amount of resin charged into a mold cavity in each molding cycle becomes constant without being affected by the charging pressure and temperature of the resin.

U.S. patent application bearing a publication number 2005/0053684 published on Mar. 10, 2005 by Pitschebeder et al. discloses an injection molding machine with a mold that can be opened and closed, into the mold cavity of which a fluid molding compound, preferably plastic, can be injected, and with at least one reading device for at least one transponder arranged in the mold cavity.

SUMMARY OF THE INVENTION

According to a first broad aspect of the present invention, there is provided a method for controlling a fill speed of an injection unit, the method executable in a computing apparatus configured to control a plunger actuator of the injection unit. The method comprises receiving an indication of a mold-cavity-filling parameter, the mold-cavity-filling parameter being indicative of a number of molding cavities of a multi-cavity mold having been filled; responsive to the mold-cavity-filling parameter satisfying a pre-determined threshold, releasing a control signal to the plunger actuator to control speed associated with a plunger of the injection unit from a first filling speed to a second filling speed.

According to a second broad aspect of the present invention, there is provided a speed management sub-system for controlling a fill speed of an injection unit. The speed management sub-system comprises a sensor associated with a multi-cavity mold, the sensor configured to detect a mold-cavity-filling parameter, the mold-cavity-filling parameter being indicative of a number of molding cavities of the multi-cavity mold having been filled; a computing apparatus operatively coupled to the sensor and to a plunger actuator configured to actuate a plunger of the injection unit, the computing apparatus being configured to receive an indication of the mold-cavity-filling parameter from the sensor; and responsive to the mold-cavity-filling parameter meeting a pre-determined threshold, to release a control signal to the plunger actuator to control speed associated with the plunger from a first filling speed to a second filling speed.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Inventors have developed embodiments of the present invention based on their appreciation of the fact that the problem of rolled threads may be attributed, at least partially, to an imbalanced nature of filling of molding cavities within a multi-cavity mold. More specifically, inventors have appreciated that, in a multi-cavity mold that includes an "unbalanced hot runner" (for example, thermally-unbalanced, rheology-unbalanced and the like), as more and more molding cavities of the multi-cavity mold get filled, the molten material filling rate, the remaining cavities are subjected to, is comparatively high. This, in turn, leads to increased shear rates experienced by the molten material filling the remaining cavities. In case of the multi-cavity mold configured for manufacturing preforms having a neck finish, this increased shear rate is particularly prominent (but is not limited to) the neck finish of the preforms. This, in turn, leads to increased temperature of the molten material, particularly, in the neck finish area of the preform. In today's aggressive cycles, the neck finish with elevated temperature of the molten material does not have enough time to cool, resulting in the demolding defects typically known as "rolled threads" or, put another way, in a preform having the neck finish smeared during demolding of the preform off a core member.

Figure 1:
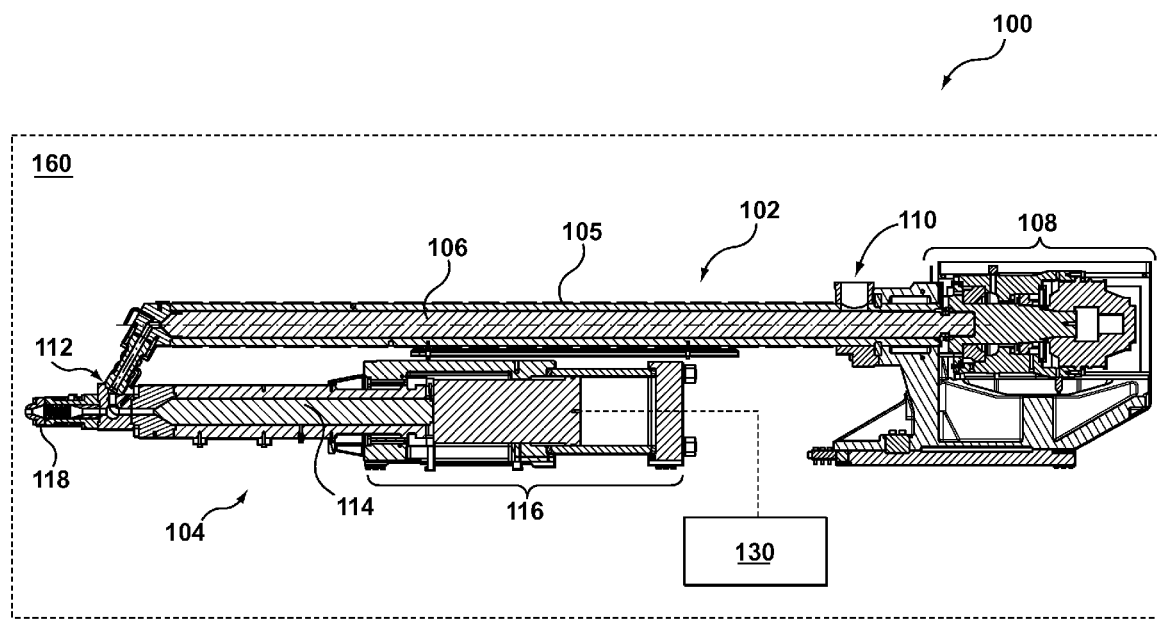
FIG. 1 depicts a sectional view of an injection unit 100 implemented according to a non-limiting embodiment of the present invention.

With reference to FIG. 1, there is depicted a non-limiting embodiment of an injection unit 100 that can be configured to implement non-limiting embodiments of the present invention. The injection unit 100 can be part of an injection molding machine 160, which is only conceptually depicted in FIG. 1, but is well known to those skilled in the art. The injection molding machine 160 can be configured for manufacturing of various molded articles. Purely as means of an example for illustrating embodiments of the present invention, it shall be assumed that the injection unit 100 is part of the injection molding machine 160 configured for manufacturing of preforms which are suitable for subsequent blow-molding into beverage containers. However, it should be expressly understood that embodiments of the present invention are not so limited and can be equally implemented within context of other type of injection equipment.

Within this non-limiting illustration of embodiments of the present invention, the injection unit 100 can be of a two-stage type and to that extent, the injection unit 100 comprises a barrel 102 and a shooting pot 104. Within the barrel 102, there is provided a screw 106 which is actuated by a screw actuator 108. Within these embodiments of the present invention, the screw actuator 108 imparts rotational and reciprocal movements to the screw 106. The barrel 102 is associated with a plurality of barrel heaters 105. Combination of the rotation of the screw 106 and heat emitted by the plurality of barrel heaters 105 causes molding raw material (such as, for example, PET) fed through an inlet 110 to melt until a desired amount of material at a desired molten state has been produced and accumulated in front of the screw 106. To facilitate feeding of the molding raw material through the inlet 110, the inlet 110 can be provided with a hopper (not depicted) or other suitable flow directing means, which are known to those of skill in the art.

Accumulation of the desired amount of material in front of the screw 106 causes the screw 106 to translate backwardly (i.e. in the right-bound direction if viewed in FIG. 1). The desired amount of material is then transferred into the shooting pot 104 via a transfer portion 112 by means of reciprocal movement of the screw 106. Suitable configurations of the transfer portion 112 are well known to those of skill in the art and, as such, need not be described here at any length. The shooting pot 104 includes a plunger 114 which is actuated by a plunger actuator 116. The plunger actuator 116 imparts a lateral movement (or, in other words, forward translation) to the plunger 114, which causes the accumulated desired amount of material to be transferred into a mold (not depicted) via a nozzle 118.

In alternative non-limiting embodiments of the present invention, the injection unit 100 can be of a single stage type or, put another way, of a type known as reciprocating screw injection unit (not depicted). Within those embodiments of the present invention, the injection unit 100 comprises a plasticizing and injecting screw (not depicted), which serves several functions, including plasticizing and injection. Within those embodiments of the present invention, the plasticizing and injecting screw combines functions of the screw 106 and the plunger 114. For the purposes of the description of the present invention, the term "plunger" also includes functionality and structure of the plasticizing and injection screw (not depicted) of the reciprocating screw injection unit (not depicted) to the extent it performs injection function. Within these embodiments of the present invention, the term "plunger actuator" also includes an actuator (not depicted) of the plasticizing and injecting screw (not depicted).

The plunger actuator 116 is operatively coupled to and is under control of a computing apparatus 130. The computing apparatus 130 can be a general purpose or special purpose processing apparatus. In some embodiments of the present invention, the computing apparatus 130 can be implemented as part of a controller (not depicted) that controls operation of the injection molding machine 160. Alternatively, the computing apparatus 130 can be implemented as a separate processing apparatus in addition to the controller (not depicted) that controls operation of the injection molding machine 160. In yet further non-limiting embodiments of the present invention, the functionality performed by the computing apparatus 130 (to be described herein below) can be distributed between one or more processing apparatuses, including (but not limited to) the controller (not depicted) that controls operation of the injection molding machine 160 and another processing apparatus potentially present within or associated with the injection molding machine 160.

The computing apparatus 130 is configured to implement several control routines that are configured to control operation of the plunger actuator 116. Some examples of these control routines include, but are not limited to, starting translation of the plunger 114, stopping translation of the plunger 114, controlling pressure that the plunger 114 exerts onto the molten material, controlling (i.e. changing) speed with which the plunger 114 translates forwardly or backwardly (or, put another way, change filling speed associated therewith) and the like.

The injection molding machine 160 further includes a multi-cavity mold, which is not depicted but well known to those of skill in the art. The multi-cavity mold (not depicted) is configured to form a plurality of molded articles, such as preforms and the like. The multi-cavity mold (not depicted) includes a melt distribution network 200 for conveying molding material from the injection unit 100 to a plurality of molding cavities defined within the multi-cavity mold (not depicted). A non-limiting embodiment of the melt distribution network 200 is depicted in FIG. 2.

The melt distribution network 200 is typically embedded in one or more plates (not depicted) and sometimes referred to by those of skill in the art as a "hot runner". The melt distribution network 200 comprises a melt inlet 202 and a plurality of melt outlets 204. The melt inlet 202 is also referred to by those of skill in the art as a "sprue bushing" and is configured to cooperate, in use, with the injection unit 100 to provide a point of entry for the molten material flow into the melt distribution network 200.

Each of the plurality of melt outlets 204 will be referred to herein below as a melt outlet 104, however, those of skill in the art sometimes also refer to the melt outlet 104 as a "drop". Each of the plurality of melt outlets 204 is configured to cooperate, in use, with a molding cavity (not depicted) defined between cooperating mold core (not depicted) and mold cavity (not depicted) to provide a point of exit for the melt from the melt distribution network 200. Even though not visible in FIG. 2, each of the plurality of melt outlets 204 defines an internal flow channel (not depicted) for the melt and terminating at an orifice (not separately numbered) of a nozzle tip 222.

Figure 2:
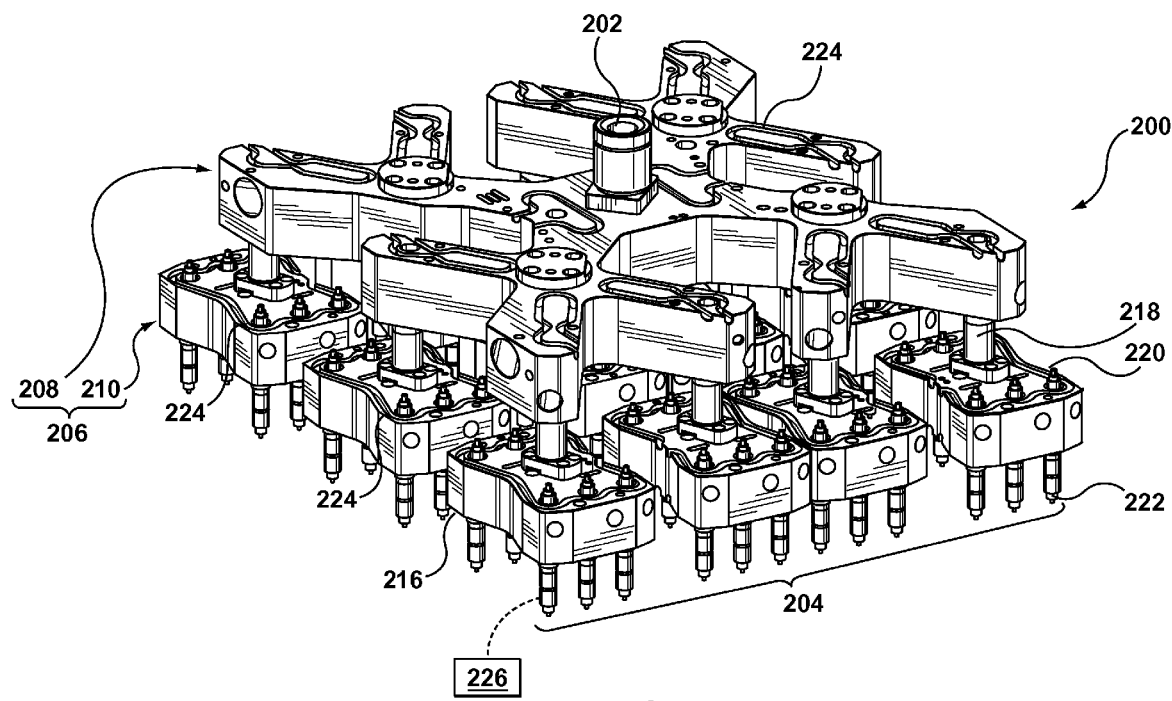
FIG. 2 depicts a perspective view of a melt distribution network 200 implemented according to a non-limiting embodiment of the present invention.

In the specific non-limiting embodiment depicted in FIG. 2, each of the plurality of melt outlets 204 is also associated with a valve stem 220 disposed, at least partially, within the internal flow channel (not depicted). The valve stem 220 is actuatable between a closed position and an open position. In the closed position, the valve stem 220 substantially obstructs the orifice (not separately numbered) associated with the nozzle tip 222 to substantially prevent flow of the melt. In the open position, the valve stem 220 substantially un-obstructs the orifice (not separately numbered) associated with the nozzle tip 222 to allow for the melt to flow. Even though not shown in FIG. 2, the valve stem 220 can be actuated by any known actuator, such as piston-type actuators and the like. In alternative non-limiting embodiments of the present invention, the nozzle tip 222 can be "thermally gated" and within those embodiments of the present invention, the valve stem 220 (and the associated actuators) can be omitted.

The melt inlet 202 is fluidly coupled to the plurality of melt outlets 204 via a network of runners 206. In the specific non-limiting embodiments depicted with reference to FIG. 2, the network of runners 206 comprises a first level sub-network 208 and a second level sub-network 210. The first level sub-network 208 is fluidly coupled to the melt inlet 202. In the specific non-limiting embodiment depicted in FIG. 2, the second level sub-network 210 comprises twelve (12) instances of a second level distributor 216. Each of the twelve instances of the second level distributor 216 is coupled to the first level sub-network 208 via a coupler 218. In some embodiments of the present invention, the coupler 218 is implemented as a transition bushing, which is implemented as an elongated tubular body.

There is also provided a plurality of heater receptacles 224, only some of which are numbered in FIG. 2 for the sake of ease of illustration. More specifically, some of the plurality of heater receptacles 224 are located in the first level sub-network 208 and some of the plurality of heater receptacles 224 are located in the second level sub-network 210. The plurality of heater receptacles 224 is configured to accept, in use, a plurality of heaters (not depicted) that is configured to provide heating to maintain a target temperature associated with the melt flowing via the melt distribution network 200.

According to non-limiting embodiments of the present invention, there is provided a sensor 226. In some embodiments of the present invention, the sensor 226 may comprise a plurality of sensors 226. The sensor 226 can be embodied in any suitable sensor to detect a "mold-cavity-filling parameter". Broadly speaking, the "mold-cavity-filling parameter" is indicative (directly or indirectly) of how many molding cavities (not depicted) of the multi-cavity mold (not depicted) have been filled with the molten material. Accordingly, in various non-limiting embodiments of the present invention, the sensor 226 can be implemented in any suitable means that can detect presence of the molten material at a given point in a molding cavity or the melt distribution network 200, which can be then correlated to the number of molding cavities of the multi-cavity mold (not depicted) that have been filled at a given point in a filling portion of a molding cycle.

Examples of suitable implementation for the sensor 226 include, but are not limited to: (i) a thermocouple for measuring temperature; (ii) a pressure gauge for measuring operating pressure; (iii) a flow measuring device for directly or indirectly measuring the rate of flow past the flow measuring device, (iv) velocity sensor for measuring velocity of the flow and the like. Naturally, other types of the sensor 226 for measuring these or other operating parameters can be used.

In some embodiments of the present invention, the sensor 226 can be associated with a given one of the plurality of melt outlets 204. In other embodiments of the present invention, each of the plurality of sensors 226 can be associated with each respective instance of the melt outlet 204. In yet further embodiments of the present invention, a given one of the plurality of sensors 126 can be associated with a given one of the plurality of melt outlets 204, so selected that only a single instance of the melt outlet 204 per each of the second level distributor 216 is associated with the given one of the plurality of sensors 226. It should be expressly understood that other configurations are also possible.

In other non-limiting embodiments of the present invention, the sensor 226 can be associated with the molding cavity (ies) of the multi-cavity mold (not depicted). As an example, each instance of the plurality of sensors 226 can be associated with each instance of the molding cavities (not depicted). In other embodiments of the present invention, a given one of the plurality of sensors 226 can be associated with a given one of the molding cavities (not depicted), so selected that a single instance of a molding cavity (not depicted) associated with the plurality of melt outlets 204 per each of the second level distributor 216 is associated with the given one of the plurality of sensors 226. Within the specific non-limiting embodiment where the sensor 226 is associated with the molding cavity (ies) (not depicted), the sensor 226 may further comprise an event detector that detects presence of a melt at a particular pre-determined position within the molding cavity, a particular melt characteristic or any other suitable type. For example, the event detector can be an on/off switch switchable by the presence of melt or an on/off switch switchable by a particular characteristic associated with the melt (such as melt temperature over a particular threshold, melt pressure over a particular threshold and the like), etc.

For example, in those embodiments of the present invention, where the sensor 226 is implemented as a thermocouple, the thermocouple can be positioned in the molding cavity in an area proximate to a neck finish of the preform to be molded. Within this implementation, detection of a temperature spike by the thermocouple is indicative of the fact that the molten material has reached the neck finish area and, therefore, can be correlated to the fact that the given molding cavity has been filled. Similar implementation can be achieved with the pressure gauge, flow measuring device, velocity sensor and event detector.

The sensor 226 is also configured to communicate with the computing apparatus 130 and, to that extent, the sensor 226 can be coupled either directly to the computing apparatus 130 (ex. via a serial, parallel or coaxial cable connection) or via a communication network (not depicted), such as a Local Area Network, Wide Area Network and the like. The communication network (not depicted) can be implemented as a wired communication network, a wireless communication network or the combination of the two.

The purpose of the sensor 226 is to detect the mold-cavity-filling parameter, the mold-cavity-filling parameter being indicative of how many of the plurality of cavities of the multi-cavity mold (not depicted) have been filled at a given time. In those embodiments of the present invention, where each of the plurality of sensors 226 is associated with either each of the melt outlet 204 or each of the plurality of molding cavities (not depicted), each of the plurality of sensors 226 detects and transmits a respective mold-cavity-filling parameter to the computing apparatus 130, which collectively form a plurality of mold-cavity-filling parameters. Within these embodiments of the present invention, the respective mold-cavity-filling parameter denotes whether or not the associated respective molding cavity has been filled. Furthermore, by analyzing the plurality of respective mold-cavity-filling parameters, the computing apparatus 130 can determine how many of the molding cavities of the multi-cavity mold (not depicted) have been filled.

In those embodiments of the present invention, where there is a single instance of the sensor 226 utilized or where the plurality of sensors 226 is associated with a sub-set of either the plurality of melt outlet 204 or a sub-set of the plurality of molding cavities (not depicted), each of the plurality of sensors 226 detects and transmits a representative mold-cavity-filling parameter (or a plurality of representative mold-cavity-filling parameters) to the computing apparatus 130. Within these embodiments of the present invention, by analyzing the representative mold-cavity-filling parameter (or the plurality of representative mold-cavity-filling parameters), the computing apparatus 130 can determine how many of the molding cavities of the multi-cavity mold (not depicted) have been filled. This analysis can be performed on the basis of an internal algorithm, which can be developed, for example, based on empirical tests. The internal algorithm can correlate a value of the representative mold-cavity-filling parameter (or the plurality of representative mold-cavity-filling parameters) to the number of the molding cavities of the multi-cavity mold (not depicted) having been filled. In a specific non-limiting example of the present invention, the sensor 226 can be implemented as a pressure transducer operative to detect a pressure spike. Within these embodiments of the present invention, the sensor 226 is positionable within the melt distribution network 200. Within these embodiments of the present invention, the internal algorithm can correlate a pressure spike detected by the sensor 226 to a particular number of molding cavities having been filled.

Figure 3:
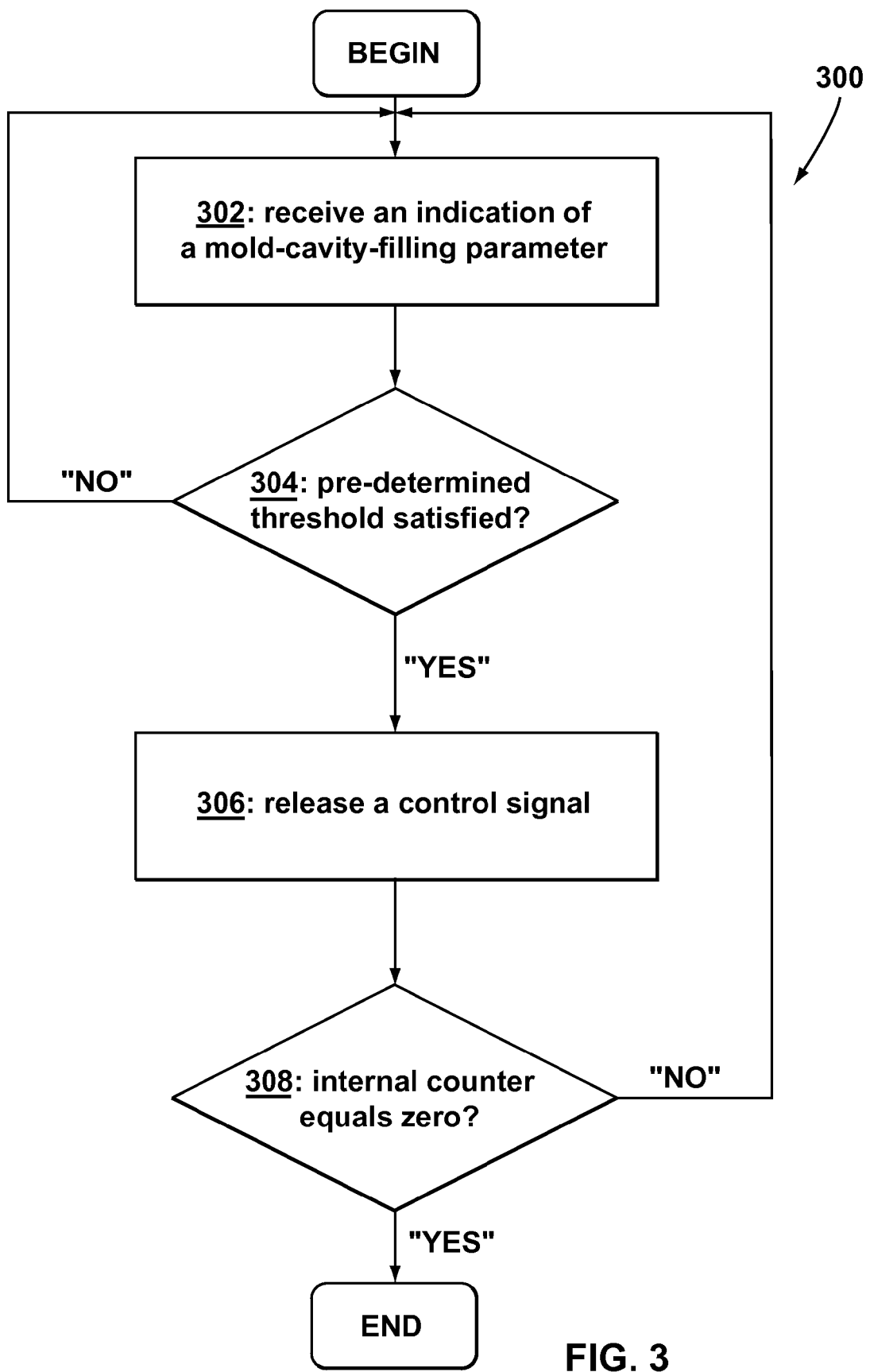
FIG. 3 depicts a flow chart of a non-limiting embodiment of a method for controlling fill speed, the method executable within the injection unit 100 of FIG. 1.

Within the architecture of FIG. 1 and FIG. 2, it can be said that a "speed management sub-system" (not separately numbered) for controlling a fill speed of an injection unit is provided. The speed management sub-system includes the sensor 226 and the computing apparatus 130. Given the architecture described with reference to FIG. 1 and FIG. 2, it is possible to implement a method for controlling a fill speed. A non-limiting embodiment of the present invention will now be described in greater detail with reference to FIG. 3, which depicts a flow chart of a non-limiting embodiment of a method 300. The method 300 can be conveniently executed by the computing apparatus 130.

Step 302—Receive an Indication of a Mold-cavity-filling Parameter

The method 300 begins at step 302, where an indication of a mold-cavity-filling parameter is received. In a specific non-limiting embodiment of the present invention, as part of step 302, the computing apparatus 130 is configured to receive an indication of the mold-cavity-filling parameter from the sensor 226. In those embodiments of the present invention, where the sensor 226 comprises the plurality of sensors 226, the computing apparatus 130 receives a respective or a representative indication of the mold-cavity-filling parameter from each of the plurality of sensors 226, as has been described in greater detail herein above.

Step 304—Determine if the Mold-cavity-filling Parameter Satisfies a Pre-determined Threshold As part of step 304, the computing apparatus 130 is configured to analyze the indication of the mold-cavity-filling parameter received as part of step 302. The purpose of this analysis is to determine whether the number of molding cavities of the multi-cavity mold (not depicted) that have been filled has reached (i.e. satisfies) the pre-determined threshold.

It is worthwhile noting that the computing apparatus 130 can maintain an indication of the pre-determined threshold in an internal memory (not depicted). How this indication is populated is not particularly limited and can be, for example, entered by a user (not depicted), hard coded into the internal memory (not depicted), generated by the computing apparatus 130 based on a calculation algorithm and the like.

In a specific non-limiting embodiment of the present invention, the pre-determined threshold can be a particular value, such as 60 percent of all molding cavities, 70 percent of all molding cavities, 80 percent of all molding cavities, 90 percent of all molding cavities or any other suitable value. It is worthwhile noting that the value for threshold can be expressed as a percentage of molding cavities filled or as an actual number of molding cavities filled. Within these specific non-limiting embodiments of the present invention, the computing apparatus 130 can set an internal counter (not depicted) to zero indicating that there is a single instance of the pre-determined threshold to be used.

In alternative non-limiting embodiment of the present invention, the pre-determined threshold may comprise a plurality of pre-determined thresholds. For example, the plurality of pre-determined thresholds may comprise three pre-determined thresholds—a first pre-determined threshold of 65 percent of all molding cavities, a second pre-determined threshold of 80 percent of all molding cavities and a third pre-determined threshold of 90 per cent of all molding cavities. Naturally, it should be understood that the number of pre-determined thresholds within the plurality of pre-determined thresholds can vary. Similarly, it should be understood that the particular values for each of the pre-determined thresholds of the plurality of pre-determined threshold may vary, as well as a "step" between any given two of the plurality of pre-determined thresholds can vary and can be either symmetric (i.e. in equal increments) or asymmetric (i.e. in non-equal increments).

Within these embodiments of the present invention, the computing apparatus 130 first compares the received mold-cavity-filling parameter with the first pre-determined threshold. Within these embodiments of the present invention, once the comparison with the first pre-determined parameter is completed, the computing apparatus 130 further sets the internal counter (not depicted) to two, which in this case is a value representative of the second pre-determined threshold and the third pre-determined threshold remaining available for comparison, as will be explained in greater detail herein below.

In those embodiments of the present invention, where the computing apparatus 130 receives an indication of a single mold-cavity-filling parameter from the sensor 226, the computing apparatus 130 compares the so-received single moldcavity-filling parameter with the pre-determined threshold (or the first pre-determined threshold in case of the plurality of pre-determined thresholds).

In those embodiments of the present invention, where the sensor 226 comprises the plurality of sensors 226 and where the computing apparatus 130 receives a respective or representative indication of the mold-cavity-filling parameter from each of the plurality of sensors 226, the computing apparatus 130 can compute an average (or a mean or a median) value of the respective or of the representative indication of the mold-cavity-filling parameter and compare the so-computed average (or mean or median) value with the pre-determined threshold.

Alternatively, the computing apparatus 130 can compare each of the received respective or representative mold-cavity-filling parameter with the pre-determined threshold and then compute how many of the received respective or representative mold-cavity-filling parameters meet or exceed the threshold. If the number of respective or representative mold-cavity-filling parameters that meet or exceed the pre-determined threshold meets or exceeds a pre-determined validation parameter, the computing apparatus 130 may conclude that the pre-determined threshold is satisfied.

If the analysis renders a negative outcome or, in other words, the mold-cavity-filling parameter does not satisfy the pre-determined threshold (or the first pre-determined threshold in case of the plurality of pre-determined thresholds), i.e. the "NO" branch of step 304, the method 300 loops back to execution of step 302 where it awaits receipt of another indication of the mold-cavity-filling parameter.

If, however, the analysis renders a positive outcome or, in other words, the mold-cavity-filling parameter satisfies the pre-determined threshold (or the first pre-determined threshold in case of the plurality of pre-determined thresholds), i.e. the "YES" branch of step 304, the method 300 proceeds to step 306.

Step 306—Responsive to the Mold-cavity-filling Parameter Satisfying the Pre-Determined Threshold, Release a Control Signal to the Plunger Actuator 116 to Control Speed Associated with a Plunger 114 from a First Filling Speed to a Second Filling Speed As part of executing step 306 and responsive to the mold-cavity-filling parameter satisfying the pre-determined threshold (or the first pre-determined threshold in case of the plurality of pre-determined thresholds), the computing apparatus 130 is further configured to release a control signal to the plunger actuator 116 to control speed associated with the plunger 114 from the first filling speed to the second filling speed. The control signal can be instrumental in causing the plunger actuator 116 to decrease the speed associated with the plunger 114 from the first filling speed to the second filling speed. How the computing apparatus 130 generates such the control signal is well known to those skilled in the art and, as such, will not be discussed here at any length.

The computing apparatus 130 can further maintain an internal mapping (not depicted) that maps a given pre-determined threshold and a value of the speed to which the plunger actuator 116 should be controlled. The control signal can be indicative of the speed retrieved from the internal mapping (not depicted) and be instrumental in causing the plunger actuator 116 to change the speed of the plunger 114 to the speed which indication is maintained within the control signal (i.e. to the second filling speed).

Step 308—the Internal Counter (not Depicted) is Set to Zero?

Next, at step 308, the computing apparatus 130 is configured to determine whether the internal counter (not depicted) is set to zero, which is indicative of either (i) a single pre-determined threshold having been set or (ii) the last one of the plurality of pre-determined thresholds having been compared with the mold-cavity-filling parameter.

In case that the computing apparatus 130 determines that the internal counter (not depicted) is set to zero, (i.e. a "YES" branch of step 306), the method 300 terminates. It is worthwhile noting, however, that execution of the method 300 can resume from step 302 at a next molding cycle.

If, on the other hand, the computing apparatus 130 determines that the internal counter (not depicted) is not set to zero, (i.e. a "NO" branch of step 308), the method 300 loops back to executing the step 302, where it awaits receipt of another indication of the mold-cavity-filling parameter. In this situation, the first instance of receiving the indication of the mold-cavity-filling parameter can be considered to be receiving a first indication of the mold-cavity-filling parameter indicative of the mold filling parameter at a first instance in time and a subsequent receiving of the indication of the mold-cavity-filling parameter can be considered to be receiving a subsequent indication (ex. a second, a third, a fourth, etc.) of the mold-cavity-filling parameter indicative of the mold-cavity-filling parameter as a subsequent instance in time. Within this scenario, the control signal generated by the computing apparatus 130 can be thought of as a first control signal, a second control signal, etc depending at which round of execution of the method 300 it is generated.

The method continues executing steps 302, 304, 306 and 308 in substantially the same manner as has been described above. In the non-limiting embodiment being presented herein, when the computing apparatus 130 determines, as part of step 304, that the second indication of the mold-cavity-filling parameter satisfies the second pre-determined threshold, the computing apparatus 130 can set the internal counter (not depicted) to one. The computing apparatus 130 then releases a second control signal that is configured to change the speed of the plunger 114 from the second filling speed to a third filling speed. Similarly, when the computing apparatus 130 determines, as part of step 304, that the third indication of the mold-cavity-filling parameter satisfies the third pre-determined threshold, the computing apparatus 130 can set the internal counter (not depicted) to zero. The computing apparatus 130 then releases a third control signal that is configured to change the speed of the plunger 114 from the third filling speed to a fourth filling speed or, alternatively, to a hold state at which points it is pressure controlled.

It is worthwhile noting that in some embodiments of the present invention, the method 300 can be executed during a filling stage of a molding cycle or, more particularly, the method 300 can be executed in real-time during each molding cycle of the injection molding machine 160. In alternative embodiments of the present invention, which are particularly applicable within the injection molding machine 160 that demonstrates high cycle-to-cycle performance repeatability, the method 300 can be used to update/correct a filling speed profile maintained in the computing apparatus 130 and such may not need to be repeated each and every molding cycle.

In yet further non-limiting embodiments of the present invention, the method 300 can be executed at a first instance in time to generate and/or update the filling speed profile, while the injection molding machine 160 is run at a second instance of time (i.e. after the first instance of time) and the so-generated filling speed profile can be used to run the injection molding machine 160. Within these embodiments of the present invention, the method 300 can be additionally executed during running of the injection molding machine 160 to determine whether the filling speed profile needs to be updated/revised in real time.

A technical effect of embodiments of the present invention may include provision of the injection unit 100 that provides for more even fill speed experienced by the molten material filling the molding cavities (not depicted) in the multi-cavity mold (not depicted). Another technical effect of embodiments of the present invention may include at least decreased occurrence of demolding defects, such as rolled threads. It should be noted that not each and every technical effect, in its entirety, needs to be enjoyed in each and every embodiment of the present invention.

Description of the non-limiting embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the non-limiting embodiments of the present invention, it will be apparent that modifications and enhancements are possible without departing from the concepts as described. Therefore, what is to be protected by way of letters patent are limited only by the scope of the following claims:

What is claimed is:

1. A method for controlling a fill speed of an injection unit, the method executable in a computing apparatus configured to control a plunger actuator of the injection unit, the method comprising:
    receiving an indication of a mold-cavity-filling parameter, the mold-cavity-filling parameter being indicative of a number of separate molding cavities of a multi-cavity mold having been filled;
    responsive to the mold-cavity-filling parameter satisfying a pre-determined threshold of the number of separate molding cavities having been filled, releasing a control signal to the plunger actuator to control speed associated with a plunger of the injection unit from a first filling speed to a second filling speed.

2. The method of claim 1, further comprising comparing the mold-cavity-filling parameter to the pre-determined threshold.

3. The method of claim 2, wherein said mold-cavity-filling parameter comprises a plurality of mold-cavity-filling parameters; and wherein said comparing comprises comparing the plurality of mold-cavity-filling parameters to the pre-determined threshold.

4. The method of claim 3, wherein said comparing the plurality of mold-cavity-filling parameters to the pre-determined threshold comprises:
    comparing each of said plurality of mold-cavity-filling parameters to the pre-determined threshold;
    comparing a number of those of said plurality of mold-cavity-filling parameters to a pre-determined validation parameter;
    if the number satisfies the pre-determined validation parameter, concluding that the pre-determined threshold is satisfied.

5. The method of claim 2, wherein said pre-determined threshold comprises a plurality of pre-determined thresholds and wherein said comparing comprises comparing the mold-cavity-filling parameter to a first of the plurality of pre-determined thresholds.

6. The method of claim 5, further comprising setting an internal counter to a value representative of a number of remaining ones of the plurality of pre-determined thresholds.

7. The method of claim 6, wherein the method further comprises:
    if the internal counter is not equal to zero, repeating said receiving, said releasing and said setting until the internal counter equals to zero.

8. The method of claim 1, further comprising generating the control signal.

9. The method of claim 5, wherein the control signal is indicative of the second filling speed to which the plunger should be controlled.

10. The method of claim 1, wherein said receiving comprises receiving the indication of the mold-cavity-filling parameter from a sensor.

11. The method of claim 1, executable in real time during each molding cycle.

12. The method of claim 1, further comprising updating a filling speed profile maintained in the computing apparatus.

13. The method of claim 12, wherein said receiving, said releasing and said updating are executed at a first instance in time and wherein the injection unit is run in a second instance of time; and wherein said injection unit is operated using the filling speed profile.

14. The method of claim 13, further comprising repeating said receiving and said releasing during said second instance of time when the injection unit is operated to determine whether the filling speed profile should be updated.

15. A speed management sub-system for controlling a fill speed of an injection unit, the speed management sub-system comprising:
    a sensor associated with a multi-cavity mold, the sensor configured to detect a mold-cavity-filling parameter, the mold-cavity-filling parameter being indicative of a number of separate molding cavities of the multi-cavity mold having been filled;
    a computing apparatus operatively coupled to the sensor and to a plunger actuator configured to actuate a plunger of the injection unit, the computing apparatus being configured to:
        receive an indication of the mold-cavity-filling parameter from the sensor;
        responsive to the mold-cavity-filling parameter meeting a pre-determined threshold of the number of separate molding cavities having been filled, to release a control signal to the plunger actuator to control speed associated with the plunger from a first filling speed to a second filling speed.

16. The speed management sub-system of claim 15, wherein the computing apparatus is further configured to compare the mold-cavity-filling parameter to the pre-determined threshold.

17. The speed management sub-system of claim 15, wherein said mold-cavity-filling parameter comprises a plurality of mold-cavity-filling parameters; and wherein to compare the mold-cavity-filling parameter to the pre-determined threshold, the computing apparatus is configured to compare the plurality of mold-cavity-filling parameters to the pre-determined threshold.

18. The speed management sub-system of claim 17, wherein to compare the mold-cavity-filling parameter to the pre-determined threshold, the computing apparatus is configured to:
    compare each of said plurality of mold-cavity-filling parameters to the pre-determined threshold;

compare a number of those of said plurality of mold-cavity-filling parameters to a pre-determined validation parameter;

if the number satisfies the pre-determined validation parameter, to conclude that the pre-determined threshold is satisfied.

19. The speed management sub-system of claim 16, wherein said pre-determined threshold comprises a plurality of pre-determined thresholds; and wherein to compare the mold-cavity-filling parameter to the pre-determined threshold, the computing apparatus is configured to compare the mold-cavity-filling parameter to a first of the plurality of pre-determined thresholds.

20. The speed management sub-system of claim 19, wherein the computing apparatus is further configured to set an internal counter to a value representative of a number of remaining ones of the plurality of pre-determined thresholds.

21. The speed management sub-system of claim 20, wherein said indication of the mold-cavity-filling parameter is a first indication of the mold-cavity-filling parameter and the control signal is a first control signal, and wherein the computing apparatus is further configured, if the internal counter is not equal to zero:

to receive a subsequent indication of the mold-cavity-filling parameter from the sensor;

responsive to the mold-cavity-filling parameter contained in the subsequent indication satisfying the pre-determined threshold, to release a second control signal to the plunger actuator to control speed associated with the plunger from the second filling speed to a third filling speed.

22. The speed management sub-system of claim 17, wherein the computing apparatus is further configured to generate the control signal.

23. The speed management sub-system of claim 15, wherein the control signal is indicative of the second filling speed to which the plunger should be controlled.

24. The speed management sub-system of claim 15, wherein the computing apparatus is further configured to update a filling speed profile maintained therein.

25. The speed management sub-system of claim 15, wherein said sensor comprises at least one of:

thermocouple;

pressure transducer;

a flow measuring device;

velocity sensor;

an on/off switch.

* * * * *